US012115646B1

(12) United States Patent
Chuang

(10) Patent No.: US 12,115,646 B1
(45) Date of Patent: Oct. 15, 2024

(54) BICYCLE REPAIR STAND

(71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 0 days.

(21) Appl. No.: 18/318,806

(22) Filed: May 17, 2023

(30) Foreign Application Priority Data

Apr. 7, 2023 (TW) ................ 112113153

(51) Int. Cl.
B25H 1/00 (2006.01)
B62H 3/12 (2006.01)

(52) U.S. Cl.
CPC ............ *B25H 1/0014* (2013.01); *B62H 3/12* (2013.01)

(58) Field of Classification Search
CPC ............... B25H 1/0014; B62H 3/12
USPC ..................... 211/22, 21; 248/910
See application file for complete search history.

(56) References Cited

U.S. PATENT DOCUMENTS

| 2,527,906 | A | * | 10/1950 | Bennett | A63B 69/0075 473/417 |
| 3,119,588 | A | * | 1/1964 | Keats | E01F 9/688 40/607.04 |
| 3,514,091 | A | * | 5/1970 | Engstrom | B25H 1/0014 269/68 |
| 3,589,717 | A | * | 6/1971 | Alexander | A63B 69/16 482/61 |
| 3,596,866 | A | * | 8/1971 | Baker | A47B 97/08 190/11 |
| 4,269,096 | A | * | 5/1981 | Boone | B23D 47/025 144/286.5 |
| 4,892,190 | A | * | 1/1990 | Delgado | B65D 85/68 206/335 |
| 5,141,211 | A | * | 8/1992 | Adams, Jr. | B25H 3/06 269/69 |
| 5,377,976 | A | * | 1/1995 | Matherne | A63B 63/083 473/483 |
| 5,390,914 | A | * | 2/1995 | Schroeder | A63B 63/083 473/483 |
| 5,415,393 | A | * | 5/1995 | Fitzsimmons | A63B 71/023 248/528 |
| 5,497,967 | A | * | 3/1996 | Gantois | B25H 1/0014 248/166 |
| 5,544,763 | A | * | 8/1996 | McClain | B25H 1/0014 248/176.1 |
| 5,632,480 | A | * | 5/1997 | Davis | A63B 71/023 473/483 |
| 5,765,821 | A | * | 6/1998 | Janisse | B25H 1/0014 269/69 |
| 5,826,719 | A | * | 10/1998 | Chen | B25H 3/028 312/902 |

(Continued)

FOREIGN PATENT DOCUMENTS

DE 9015322 U1 1/1991
FR 2306118 A1 10/1976

*Primary Examiner* — Jennifer E. Novosad
(74) *Attorney, Agent, or Firm* — MUNCY, GEISSLER, OLDS & LOWE, P.C.

(57) ABSTRACT

A bicycle repair stand includes a support unit and a storage unit. The support unit includes a base and a support rod connected on the base. The support rod is configured to support a bicycle. The storage unit includes a housing that has a storage space, a first receiving groove and a second receiving groove. The first receiving groove detachably receives the base, and the second receiving groove detachably receives the support rod.

7 Claims, 6 Drawing Sheets

(56) References Cited

U.S. PATENT DOCUMENTS

| | | | | |
|---|---|---|---|---|
| 5,836,838 A | * | 11/1998 | van Nimwegen | A63B 63/083 473/481 |
| 5,979,844 A | * | 11/1999 | Hopkins | E01F 9/692 248/910 |
| 6,371,309 B1 | * | 4/2002 | Smith | B62H 3/12 248/230.1 |
| 6,889,953 B2 | * | 5/2005 | Harbaugh | E04H 12/2246 248/539 |
| 7,176,366 B1 | * | 2/2007 | Bruce | A47B 81/00 84/327 |
| 7,614,600 B1 | * | 11/2009 | Smith | G09F 23/00 248/910 |
| 7,674,194 B2 | * | 3/2010 | Lortscher | A63B 69/0075 473/422 |
| 7,722,004 B2 | * | 5/2010 | Holden | B29C 51/10 248/346.01 |
| 8,500,074 B1 | * | 8/2013 | Cochran | B62H 3/12 248/129 |
| 8,833,709 B2 | * | 9/2014 | Weng | A45B 23/00 248/129 |
| 8,893,900 B2 | * | 11/2014 | Kedar | B62H 3/08 211/20 |
| 9,004,137 B2 | * | 4/2015 | Voegeli | B25H 1/0014 157/14 |
| 9,033,160 B1 | | 5/2015 | Diorio | |
| 9,676,433 B2 | * | 6/2017 | Paulssen | B62H 3/04 |
| 10,252,759 B2 | * | 4/2019 | Chuang | F16M 11/38 |
| 10,329,083 B1 | * | 6/2019 | Chuang | B62J 19/00 |
| D972,835 S | * | 12/2022 | McIntosh | D3/10 |
| 11,731,019 B2 | * | 8/2023 | Greiner | A63B 71/0036 473/483 |
| 2004/0050807 A1 | * | 3/2004 | Cheng | B62H 3/12 211/171 |
| 2013/0146739 A1 | * | 6/2013 | Zhao | E04H 12/2246 248/519 |
| 2017/0120974 A1 | * | 5/2017 | Peruzzo | B62H 3/06 |
| 2020/0260827 A1 | | 8/2020 | Lim et al. | |

* cited by examiner

BICYCLE REPAIR STAND

BACKGROUND OF THE INVENTION

The present invention relates to a bicycle repair stand and, more particularly, to a bicycle repair stand that facilitates to access of tools for repairs.

U.S. Pat. No. 9,033,160 discloses a bicycle stand, which has a base, an upright support structure extending upwardly from the base to a top end, and a spindle engaging post that extends outwardly from the top end of the upright support structure, for engaging a spindle of a bicycle so that the bicycle stand supports the bicycle in an upright position on a surface.

However, when using the aforementioned bicycle stand, the tools used for repairs or the disassembled bicycle parts are often scattered and placed on the ground around the bicycle stand. Not only does this create a cluttered work environment, making it inconvenient to access the tools, but it also increases the risk of accidental injuries from stepping on the tools or the disassembled bicycle parts inadvertently.

Thus, a need exists for a bicycle repair stand to mitigate and/or obviate the above disadvantages.

SUMMARY OF THE INVENTION

An objective of the present invention is to provide a bicycle repair stand that includes a support unit and a storage unit. The support unit includes a base and a support rod connected on the base. The support rod is configured to support a bicycle. The storage unit includes a housing that has a storage space, a first receiving groove and a second receiving groove. The first receiving groove detachably receives the base, and the second receiving groove detachably receives the support rod.

In an embodiment, the housing defines a top side and a bottom side opposite to the top side along a height direction. The top side of the housing forms an opening communicating the storage space. The housing has a bottom wall and a side wall enclosing the storage space. The first receiving groove is formed on the bottom side and disposed between the bottom wall and the side wall, and the second receiving groove is formed on the side wall.

In an embodiment, the first receiving groove extends along a circumferential direction of the housing and corresponds to the base of the support unit. The first receiving groove has a first receiving opening opening towards the bottom side of the housing, allowing the base to enter the first receiving groove through the first receiving opening and to be received within the first receiving groove.

In an embodiment, the first receiving groove is further provided with at least one limiting block formed on an inner side of the side wall. The at least one limiting block is configured to abut against the base when the first receiving groove receives the base.

In an embodiment, the second receiving groove extends along the height direction of the housing and corresponds to the support rod of the support unit. The second receiving groove has a second receiving opening opening towards a radial direction of the second receiving groove, allowing at least part of the support rod to enter the second receiving groove through the second receiving opening and to be received within the second receiving groove.

In an embodiment, the support unit further includes a support leg connected to the base. The support rod is connected on the support leg along the height direction. The housing is further provided with a third receiving groove is connected between the first receiving groove and the second receiving groove. The third receiving groove detachably receives the support leg.

In an embodiment, the storage unit further includes two cover plates pivotally connected to the side wall of the housing to selectively open or close the opening.

In an embodiment, the side wall of the housing is provided with two connection holes extending along the height direction. The storage unit further includes two pivot members respectively passing through the two cover plates and connected to the two connection holes.

In an embodiment, the side wall of the housing is provided with at least two engaging slots arranged opposite to each other. The storage unit further includes a division plate having two engaging portions disposed on opposite sides of the division plate and detachably engaged with the at least two engaging slots.

In an embodiment, the support rod is provided with a first hanger and a second hanger positioned at different heights along the height direction for hooking a rear upper fork and a rear lower fork of the bicycle.

The present invention will become clearer in light of the following detailed description of illustrative embodiments of this invention described in connection with the drawings.

DETAILED DESCRIPTION OF THE INVENTION

Figure 1:
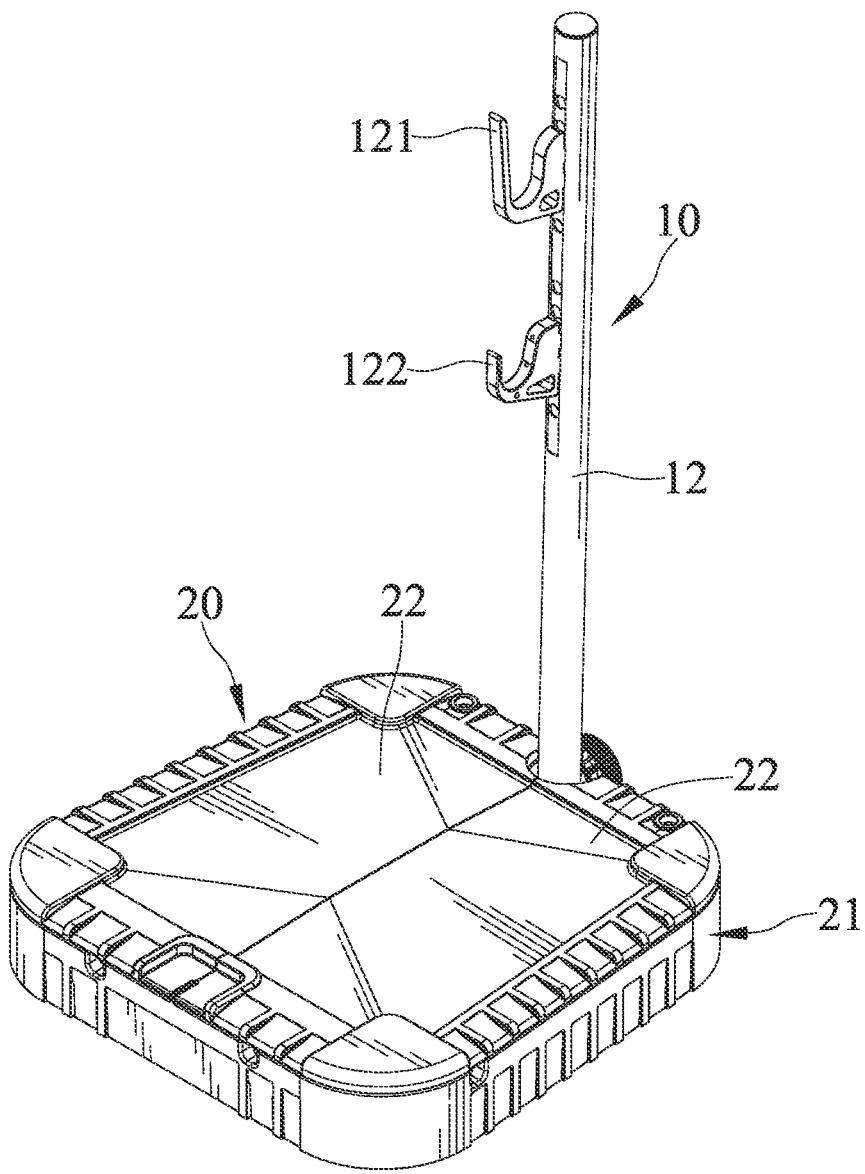
FIG. 1 is a perspective view of a bicycle repair stand of an embodiment according to the present invention.
Figure 2:
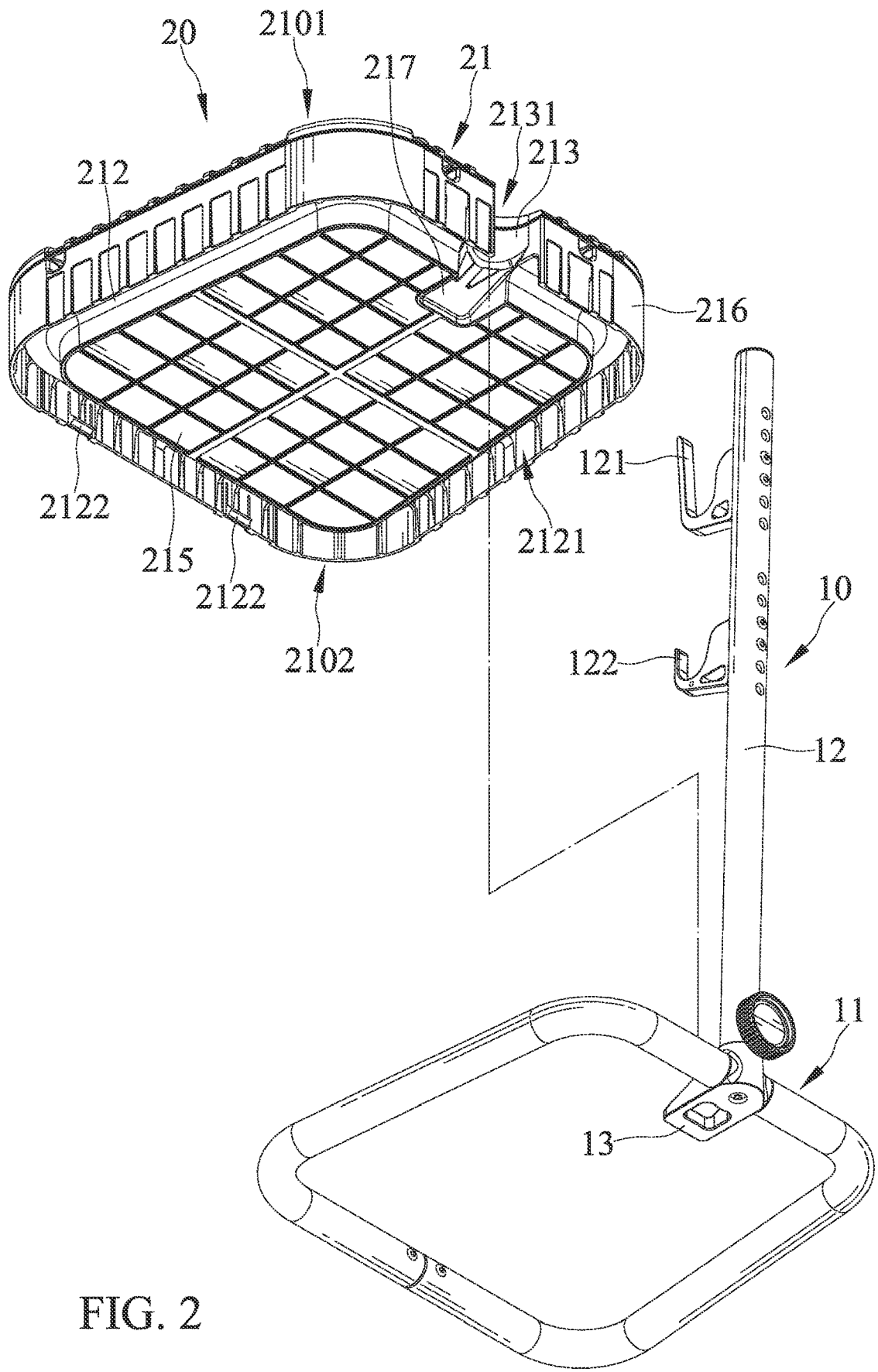
FIG. 2 is an exploded perspective view of the bicycle repair stand of FIG. 1.
Figure 3:
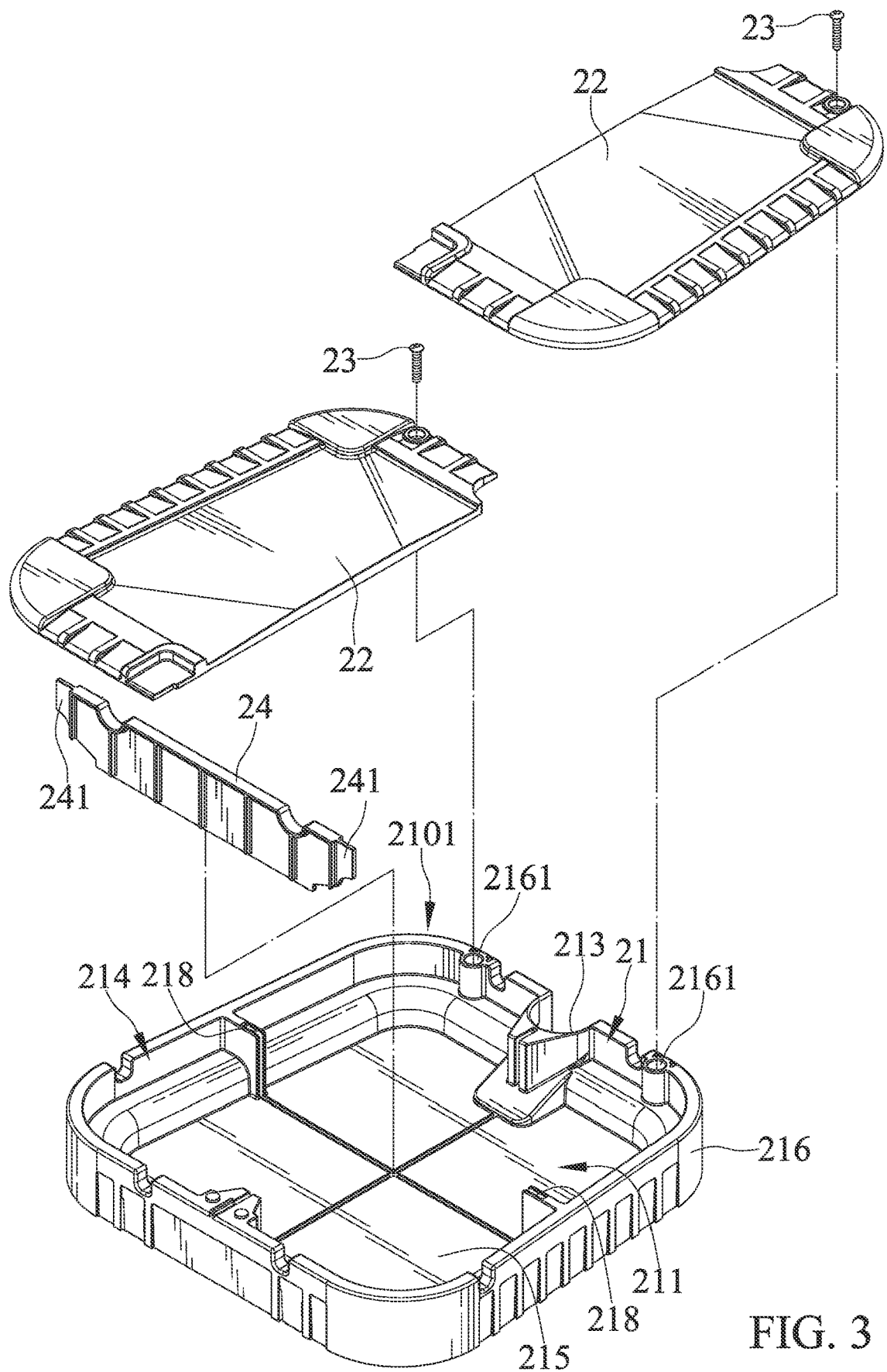
FIG. 3 is an exploded perspective view of a storage unit of the bicycle repair stand of FIG. 1.
Figure 4:
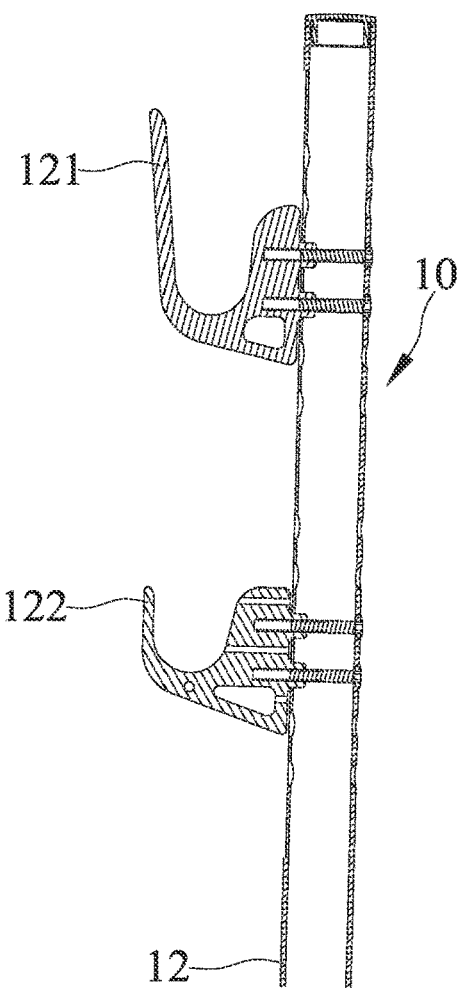
FIG. 4 is a cross sectional view of the bicycle repair stand of FIG. 1.
Figure 4:
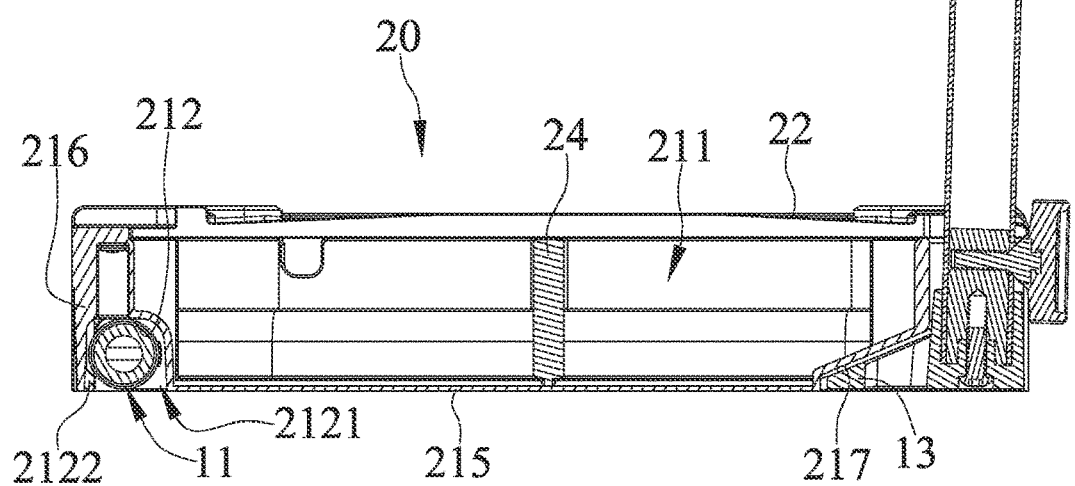
Figure 5:
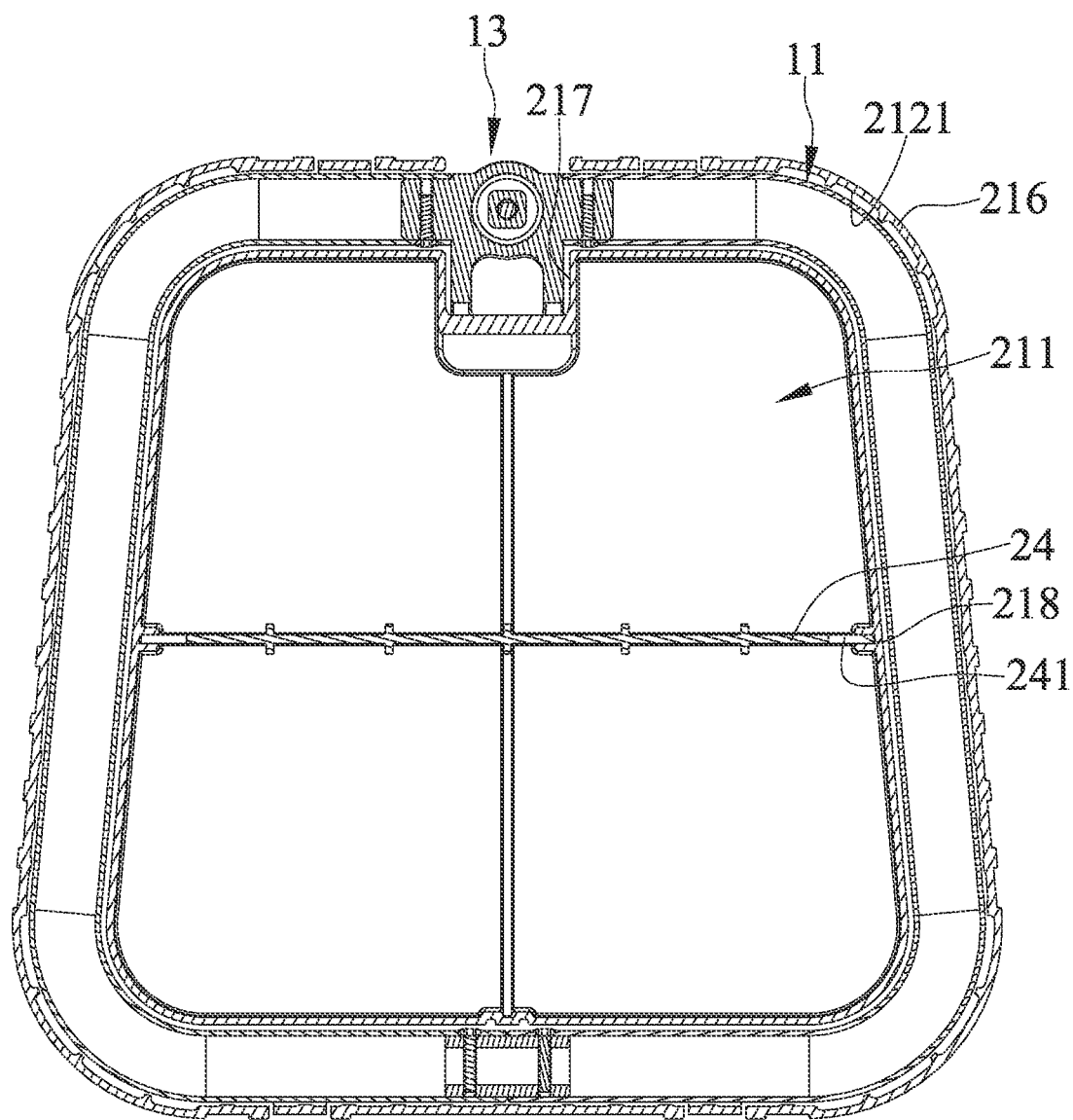
FIG. 5 is another cross sectional view of the bicycle repair stand of FIG. 1.

FIGS. 1-6 show a bicycle repair stand of an embodiment according to the present invention. The bicycle repair stand includes a support unit 10 and storage unit 20. The support unit 10 includes a base 11 and a support rod 12 connected on the base 11. The support rod 12 is configured to support a bicycle (not shown) in an upright position on a surface. Further, the support rod 12 is provided with a first hanger 121 and a second hanger 122 positioned at different heights along a height direction for hooking a rear upper fork and a rear lower fork of the bicycle.

The storage unit 20 includes a housing 21 that has a storage space 211, a first receiving groove 212 and a second receiving groove 213. The storage space 211 can accommodate tools or bicycle parts. The first receiving groove 212 detachably receives the base 11, and the second receiving groove 213 detachably receives the support rod 12. Thus, the storage unit 20 can detachably receive the base 11 and support rod 12 of the support unit 10 through the first receiving groove 212 and the second receiving groove 213, allowing users to easily access or store the tools or bicycle parts needed for repairs when the bicycle is supported on the support rod 12.

The housing 21 defines a top side 2101 and a bottom side 2102 opposite to the top side 2101 along the height direction. The top side 2101 of the housing 21 forms an opening 214 communicating the storage space 211. The housing has a bottom wall 215 and a side wall 216 enclosing the storage space 211. The first receiving groove 212 may be formed on the bottom side 2102 and disposed between the bottom wall 215 and the side wall 216, and the second receiving groove 213 may be formed on the side wall 216.

The first receiving groove 212 extends along a circumferential direction of the housing 21 and corresponds to the base 11 of the support unit 10. The first receiving groove 212 has a first receiving opening 2121 opening towards the bottom side 2102 of the housing 21, allowing the base 11 to enter the first receiving groove 212 through the first receiving opening 2121 and to be received within the first receiving groove 212.

The first receiving groove 212 is further provided with at least one limiting block 2122 formed on an inner side of the side wall 216. The at least one limiting block 2122 is configured to abut against the base 11 when the first receiving groove 212 receives the base 11 to prevent the base 11 to detach from the first receiving groove 212 through the first receiving opening 2121.

The second receiving groove 213 extends along the height direction of the housing 21 and corresponds to the support rod 12 of the support unit 10. The second receiving groove 213 has a second receiving opening 2131 opening towards a radial direction of the second receiving groove 213, allowing at least part of the support rod 12 to enter the second receiving groove 213 through the second receiving opening 2131 and to be received within the second receiving groove 213.

In the embodiment, the support unit 10 may further include a support leg 13 connected to the base 11. The support rod 12 is connected to the support leg 13 along the height direction to enhance the stability of base 11. The housing 21 is further provided with a third receiving groove 217 is connected between the first receiving groove 212 and the second receiving groove 213. The third receiving groove 217 detachably receives the support leg 13. Moreover, when the first receiving groove 212 receives the base 11, and the second receiving groove 213 receives the support rod 12, the third receiving groove 217 also receives the support leg 13.

Figure 6:
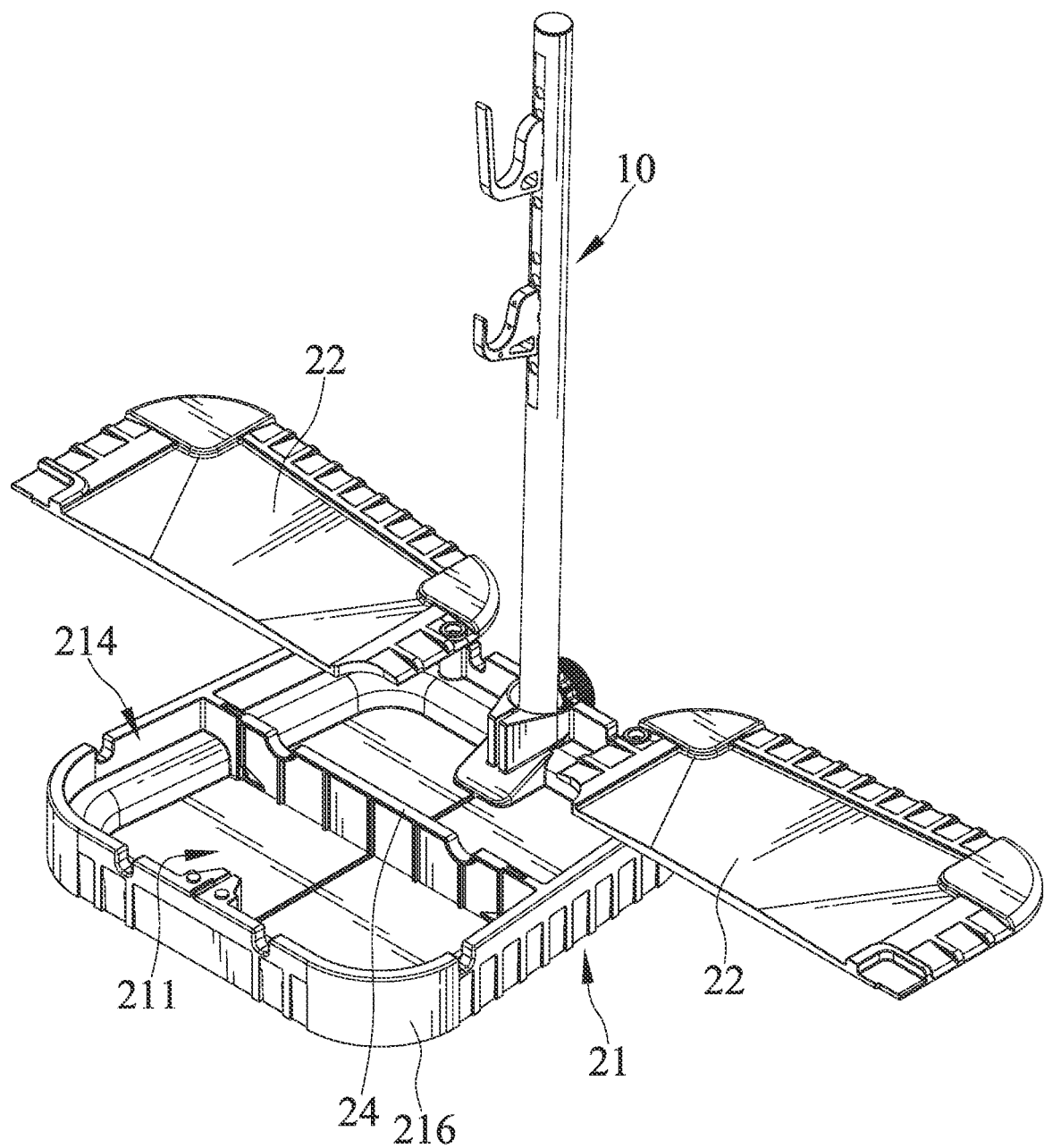
FIG. 6 is another perspective view of the bicycle repair stand of FIG. 1 and shows two cover plates pivoted in relation to a housing to open the opening of the housing.

Further, the storage unit 20 further includes two cover plates 22 pivotally connected to the side wall 216 of the housing 21 to selectively open or close the opening 214 to prevent the tools or the bicycle parts detached from the storage space 211. As shown in FIG. 6, the two cover plates 22 are pivoted in relation to the housing 21 to open the opening 214. Further, the side wall 216 of the housing 21 is provided with two connection holes 2161 extending along the height direction. The storage unit 20 further includes two pivot members 23 respectively passing through the two cover plates 22 and connected to the two connection holes 2161, allowing the two cover plates 22 to be pivotally connected on the side wall 216.

In addition, the side wall 216 of the housing 21 is provided with at least two engaging slots 218 arranged opposite to each other. The storage unit 20 further includes a division plate 24 having two engaging portions 241 disposed on opposite sides of the division plate 24 and detachably engaged with the at least two engaging slots 218, allowing the division plate 24 to divide the storage space 211 for easy usage.

In summary, the storage unit 20 selectively receives the support unit 10 for convenient access or placement of the tools or the bicycle parts.

Although specific embodiments have been illustrated and described, numerous modifications and variations are still possible without departing from the scope of the invention. The scope of the invention is limited by the accompanying claims.

The invention claimed is:
1. A bicycle repair stand comprising:
a support unit including a base and a support rod connected on the base, wherein the support rod is configured to support a bicycle; and
a storage unit including a housing, wherein the housing has a storage space, a first receiving groove and a second receiving groove, wherein the first receiving groove detachably receives the base, wherein the second receiving groove detachably receives the support rod, wherein the housing defines a top side and a bottom side opposite to the top side along a height direction, wherein the top side of the housing forms an opening communicating the storage space, wherein the housing has a bottom wall and a side wall enclosing the storage space, wherein the first receiving groove is formed on the bottom side and disposed between the bottom wall and the side wall, wherein the second receiving groove is formed on the side wall, wherein the first receiving groove extends along a circumferential direction of the housing and corresponds to the base of the support unit, wherein the first receiving groove has a first receiving opening opening towards the bottom side of the housing, allowing the base to enter the first receiving groove through the first receiving opening and to be received within the first receiving groove.

2. The bicycle repair stand as claimed in claim 1, wherein the first receiving groove is further provided with at least one limiting block formed on an inner side of the side wall, and wherein the at least one limiting block is configured to abut against the base when the first receiving groove receives the base.

3. The bicycle repair stand as claimed in claim 1, wherein the second receiving groove extends along the height direction of the housing and corresponds to the support rod of the support unit, wherein the second receiving groove has a second receiving opening opening towards a radial direction of the second receiving groove, allowing at least part of the support rod to enter the second receiving groove through the second receiving opening and to be received within the second receiving groove.

4. The bicycle repair stand as claimed in claim 1, wherein the side wall of the housing is provided with at least two engaging slots arranged opposite to each other, and wherein the storage unit further includes a division plate having two engaging portions disposed on opposite sides of the division plate and detachably engaged with the at least two engaging slots.

5. The bicycle repair stand as claimed in claim 1, wherein the support rod is provided with a first hanger and a second hanger positioned at different heights along the height direction for hooking a rear upper fork and a rear lower fork of the bicycle.

6. A bicycle repair stand comprising:
a support unit including a base and a support rod connected on the base, wherein the support rod is configured to support a bicycle; and a storage unit including a housing, wherein the housing has a storage space, a first receiving groove and a second receiving groove, wherein the first receiving groove detachably receives the base, wherein the second receiving groove detachably receives the support rod, wherein the housing defines a top side and a bottom side opposite to the top side along a height direction, wherein the top side of the housing forms an opening communicating the storage space, wherein the housing has a bottom wall and a side wall enclosing the storage space, wherein the first receiving groove is formed on the bottom side and disposed between the bottom wall and the side wall, wherein the second receiving groove is formed on the side wall, wherein the support unit further includes a support leg connected to the base, wherein the support rod is connected to the support leg along the height direction, wherein the housing is further provided with a third receiving groove connected between the first receiving groove and the second receiving groove, and wherein the third receiving groove detachably receives the support leg.

7. A bicycle repair stand comprising:

a support unit including a base and a support rod connected on the base, wherein the support rod is configured to support a bicycle; and a storage unit including a housing, wherein the housing has a storage space, a first receiving groove and a second receiving groove, wherein the first receiving groove detachably receives the base, wherein the second receiving groove detachably receives the support rod, wherein the housing defines a top side and a bottom side opposite to the top side along a height direction, wherein the top side of the housing forms an opening communicating the storage space, wherein the housing has a bottom wall and a side wall enclosing the storage space, wherein the first receiving groove is formed on the bottom side and disposed between the bottom wall and the side wall, wherein the second receiving groove is formed on the side wall, wherein the storage unit further includes two cover plates pivotally connected to the side wall of the housing to selectively open or close the opening, wherein the side wall of the housing is provided with two connection holes extending along the height direction, and wherein the storage unit further includes two pivot members respectively passing through the two cover plates and connected to the two connection holes.

\* \* \* \* \*